(12) United States Patent
Aquino et al.

(10) Patent No.: US 10,703,066 B2
(45) Date of Patent: Jul. 7, 2020

(54) SPIRAL WRAPPED NONWOVEN SLEEVE AND METHOD OF CONSTRUCTION THEREOF

(71) Applicant: Federal-Mogul Powertrain, Inc., Southfield, MI (US)

(72) Inventors: Luis Aquino, El Paso, TX (US); Jose De La Cruz, Fabens, TX (US); Arturo Fong, El Paso, TX (US); Jesus Arenivar, El Paso, TX (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 802 days.

(21) Appl. No.: 14/550,621

(22) Filed: Nov. 21, 2014

(65) Prior Publication Data

US 2015/0147498 A1    May 28, 2015

Related U.S. Application Data

(60) Provisional application No. 61/908,535, filed on Nov. 25, 2013.

(51) Int. Cl.
*B32B 1/08* (2006.01)
*B32B 15/14* (2006.01)
(Continued)

(52) U.S. Cl.
CPC ............... *B32B 1/08* (2013.01); *B32B 5/022* (2013.01); *B32B 5/26* (2013.01); *B32B 7/12* (2013.01);
(Continued)

(58) Field of Classification Search
CPC ......... Y10T 428/1362; Y10T 428/1314; B32B 1/08; B32B 7/12; B32B 5/26;
(Continued)

(56) References Cited

U.S. PATENT DOCUMENTS 5,205,479 A    4/1993  Rice et al.
5,660,899 A *  8/1997  Rockney ............... F16L 11/118
                                            138/122
(Continued)

FOREIGN PATENT DOCUMENTS

CN    102057207      5/2011
CN    102317524 A    1/2012
(Continued)

OTHER PUBLICATIONS

International Search Report, dated Apr. 2, 2015 (PCT/US2014/067003).

*Primary Examiner* — Gerard Higgins
*Assistant Examiner* — Kevin C Ortman, Jr.
(74) *Attorney, Agent, or Firm* — Robert L. Stearns; Dickinson Wright, PLLC

(57) ABSTRACT

A nonwoven sleeve and method of construction thereof is provided, with the nonwoven sleeve having a tubular nonwoven wall bounding an inner cavity for receipt of an elongate member therein. The tubular nonwoven wall includes a strip of nonwoven material spiral wrapped about a central longitudinal axis of the wall, with opposite edges of the strip being brought into abutment with one another to form a spiral butt joint. The opposite edges of the nonwoven strip are bonded together across the butt joint by melted material of the strip. The nonwoven strip is bonded in tubular fashion along its length such that the nonwoven wall is not subject to unraveling and forming loose end pieces of the strip of nonwoven material.

9 Claims, 2 Drawing Sheets

(51) Int. Cl.
  *B32B 27/04*   (2006.01)
  *B32B 37/14*   (2006.01)
  *B32B 5/02*    (2006.01)
  *B32B 5/26*    (2006.01)
  *B32B 7/12*    (2006.01)
  *B29C 53/60*   (2006.01)
  *B29C 53/58*   (2006.01)

(52) U.S. Cl.
  CPC ............ *B32B 15/14* (2013.01); *B29C 53/581* (2013.01); *B29C 53/60* (2013.01); *B32B 2262/101* (2013.01); *B32B 2307/416* (2013.01); *B32B 2597/00* (2013.01); *Y10T 428/1314* (2015.01); *Y10T 428/1362* (2015.01)

(58) Field of Classification Search
  CPC ... B32B 15/14; B32B 5/022; B32B 2307/416; B32B 2597/00; B32B 2262/101; B29C 53/581; B29C 53/60
  USPC ................................ 428/34.5, 36.1; 156/187
  See application file for complete search history.

(56) References Cited

U.S. PATENT DOCUMENTS

| | | | |
|---|---|---|---|
| 5,713,399 A | 2/1998 | Collette et al. | |
| 5,785,607 A | 7/1998 | Huang | |
| 6,162,518 A | 12/2000 | Korfer | |
| 6,331,341 B1 | 12/2001 | Joyce | |
| 6,491,794 B2 | 12/2002 | Davenport | |
| 6,565,713 B2 | 5/2003 | Hansen et al. | |
| 7,147,756 B2 | 12/2006 | Daveport | |
| 7,799,175 B2 | 9/2010 | Hansen | |
| 2003/0030197 A1* | 2/2003 | Marks | F16L 3/26 267/136 |
| 2004/0219846 A1* | 11/2004 | Sellis | B32B 5/02 442/46 |
| 2008/0254244 A1* | 10/2008 | Yamaguchi | F16L 57/06 428/36.1 |
| 2009/0311456 A1 | 12/2009 | Harris | |
| 2010/0230064 A1 | 9/2010 | Eagles et al. | |
| 2010/0236740 A1 | 9/2010 | Mourad et al. | |
| 2012/0037263 A1 | 2/2012 | Malloy | |
| 2013/0081772 A1 | 4/2013 | Eagles et al. | |
| 2013/0199656 A1 | 8/2013 | Sherwin | |
| 2014/0174689 A1* | 6/2014 | Karlsson | D21F 1/0036 162/289 |

FOREIGN PATENT DOCUMENTS

| | | |
|---|---|---|
| DE | 202004009770 U1 | 9/2004 |
| DE | 202005004733 U1 | 6/2005 |
| EP | 0626238 A1 | 11/1994 |
| JP | S53074174 A | 7/1978 |
| JP | S57154447 A | 9/1982 |
| JP | H08233194 A | 9/1996 |
| JP | 2005098371 A | 4/2005 |
| JP | 2015516545 A | 6/2015 |
| KR | 20110126643 A | 11/2011 |
| WO | 2012024272 A1 | 2/2012 |
| WO | 2013070038 A1 | 11/2013 |
| WO | 2014105375 A1 | 7/2014 |

* cited by examiner

SPIRAL WRAPPED NONWOVEN SLEEVE AND METHOD OF CONSTRUCTION THEREOF

CROSS-REFERENCE TO RELATED APPLICATION

This application claims the benefit of U.S. Provisional Application Ser. No. 61/908,535, filed Nov. 25, 2013, which is incorporated herein by reference in its entirety.

BACKGROUND OF THE INVENTION

1. Technical Field

This invention relates generally to protective textile sleeves, and more particularly to spiral wrapped nonwoven protective sleeves.

2. Related Art

It is known to construct protective textile sleeves from a nonwoven material, and it is further known to spiral wrap the nonwoven material to form a protective sleeve. Typically, upon spiral wrapping the nonwoven material, an adhesive layer, such as tape, is spiral wrapped about an outer surface of the nonwoven material to hold the nonwoven material in its wrapped configuration. Unfortunately, although an intermediate region of the nonwoven material extending between opposite ends of the nonwoven material is generally maintained in its wrapped configuration by the overlying adhesive layer, the end regions are prone to coming at least partially unwrapped, which can diminish the protective effectiveness of the textile sleeve, aside from being unsightly. This problem can be particularly troublesome when the ends of the spiral wrapped nonwoven material are cut subsequent to having the outer adhesive layer wrapped in bonded fashion thereto. In addition to the possibility of the ends becoming unwrapped, the need for an additional adhesive layer to hold the underlying spiral wrapped nonwoven material in place adds cost to the manufacture process, and ultimately to the end product.

SUMMARY OF THE INVENTION

In accordance with one aspect of the invention, a nonwoven sleeve for providing protection to a member therein is provided. The nonwoven sleeve has a tubular nonwoven wall extending along a central longitudinal axis. The tubular nonwoven wall includes a strip of nonwoven material spiral wrapped about the central longitudinal axis, with opposite edges of the strip being brought into abutment with one another to form a spiral butt joint. The opposite edges of the strip are bonded together across the butt joint by melted material of the strip. As such, the strip is securely bonded in tubular fashion along its entire length such that the nonwoven wall does not have or develop undesirable, loose end pieces of the strip of nonwoven material.

In accordance with another aspect of the invention, an intermediate region of the nonwoven strip extending between the spiral butt joint remains unmelted, and thus, the intermediate region of unmelted material remains highly flexible for routing over a meandering path.

In accordance with another aspect of the invention, the nonwoven sleeve further includes a reflective outer layer.

In accordance with another aspect of the invention, the nonwoven sleeve further includes an intermediate scrim layer between the tubular nonwoven wall and the reflective outer layer.

In accordance with another aspect of the invention, the reflective outer layer and the intermediate layer are spiral wrapped about the tubular nonwoven wall.

In accordance with another aspect of the invention, a method of constructing a nonwoven sleeve having a tubular nonwoven wall extending along a central longitudinal axis for providing protection to an elongate member contained therein is provided. The method includes spiral wrapping a strip of nonwoven material about the central longitudinal axis and bringing opposite edges of the nonwoven strip into abutment with one another to form a spirally extending butt joint. The method further includes heating at least one of the opposite edges of the nonwoven material while spiral wrapping the nonwoven material to melt the heated edge, and then bonding the opposite edges together along the butt joint with the melted material of the nonwoven strip.

In accordance with another aspect of the invention, the method can further include heating only one of the opposite edges by passing the edge to be heated over a heated member prior to forming the butt joint, and then bringing the melted material of the heated edge into abutment with the opposite unheated edge to form the bonded spiral butt joint.

In accordance with another aspect of the invention, the method can further include wrapping a reflective outer layer about the tubular nonwoven wall after forming the bonded butt joint, wherein the reflective layer forms a cylindrically smooth outer surface as a result of the underlying bonded butt joint.

In accordance with another aspect of the invention, the method can further include sandwiching an intermediate scrim layer between the tubular nonwoven wall and the reflective outer layer.

In accordance with another aspect of the invention, the method can further include bonding the intermediate layer to the reflective outer layer to first form a laminate strip, and then spiral wrapping the laminate strip about the spiral wrapped tubular nonwoven wall.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
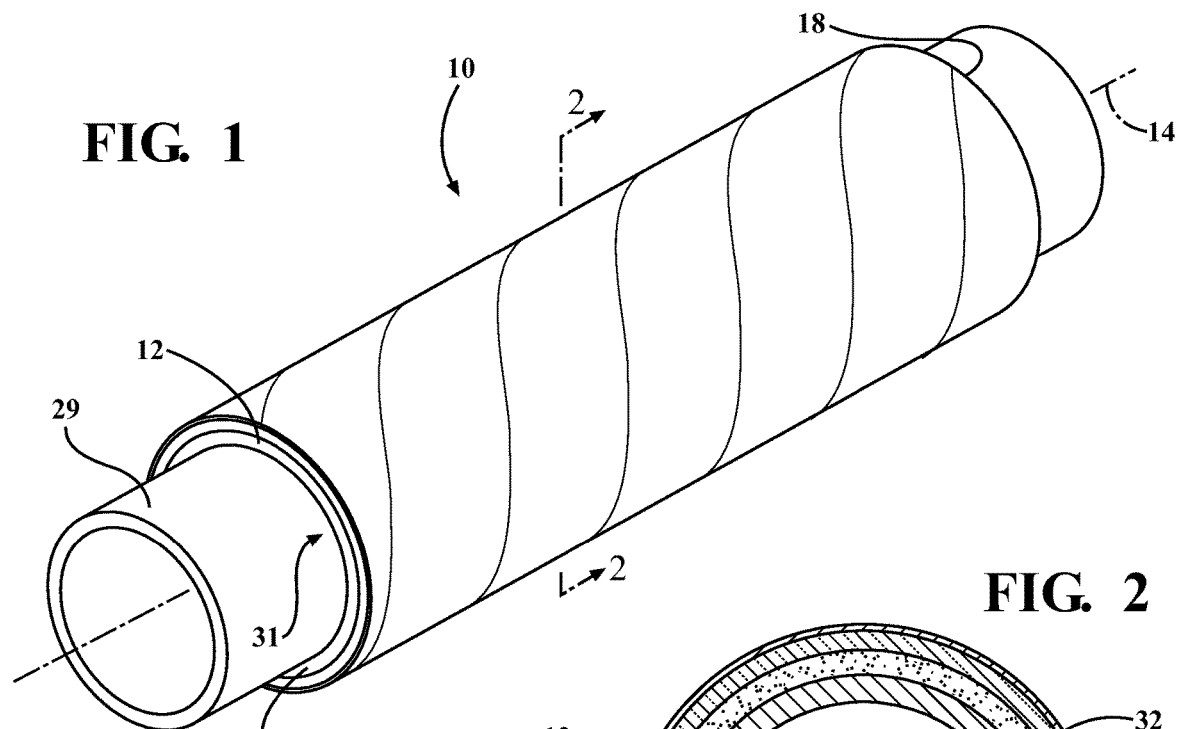
FIG. 1 is perspective view of a nonwoven sleeve constructed in accordance with one aspect of the invention for providing protection to a member therein.
Figure 2:
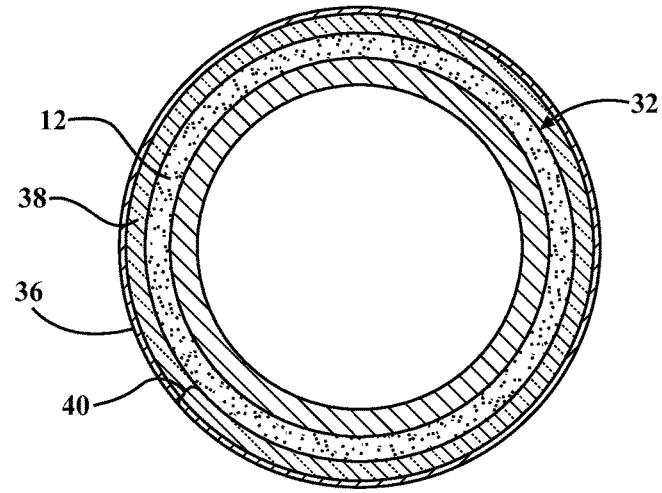
FIG. 2 is cross-sectional view of the sleeve of FIG. 1.
Figure 3:
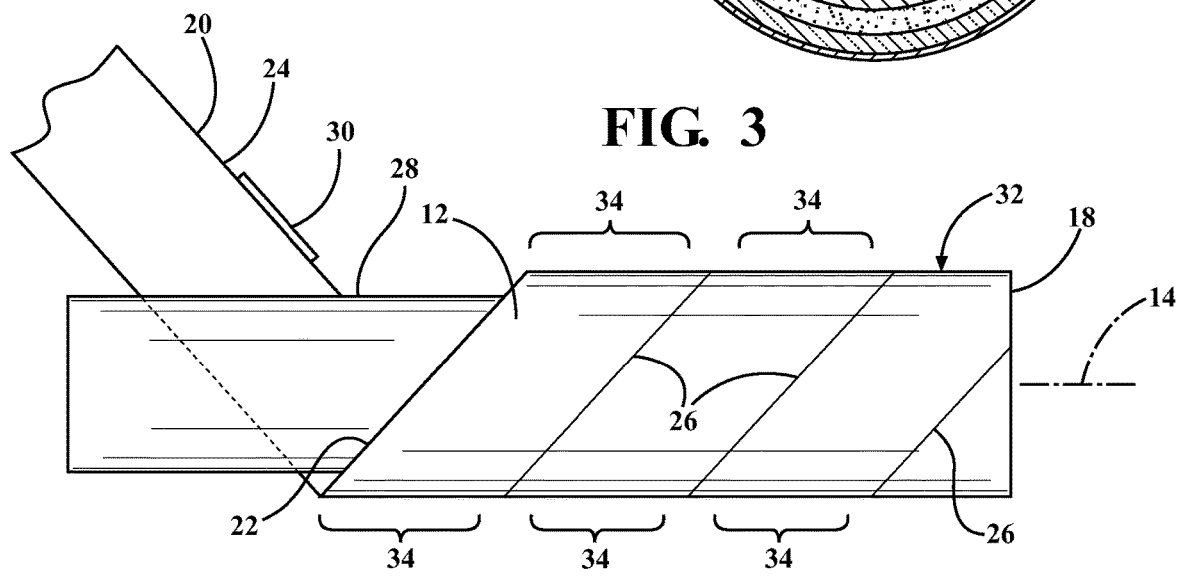
FIG. 3 is a side view showing a nonwoven strip being spiral wrapped to form at least a portion of a sleeve constructed in accordance with the invention.
Figure 4:
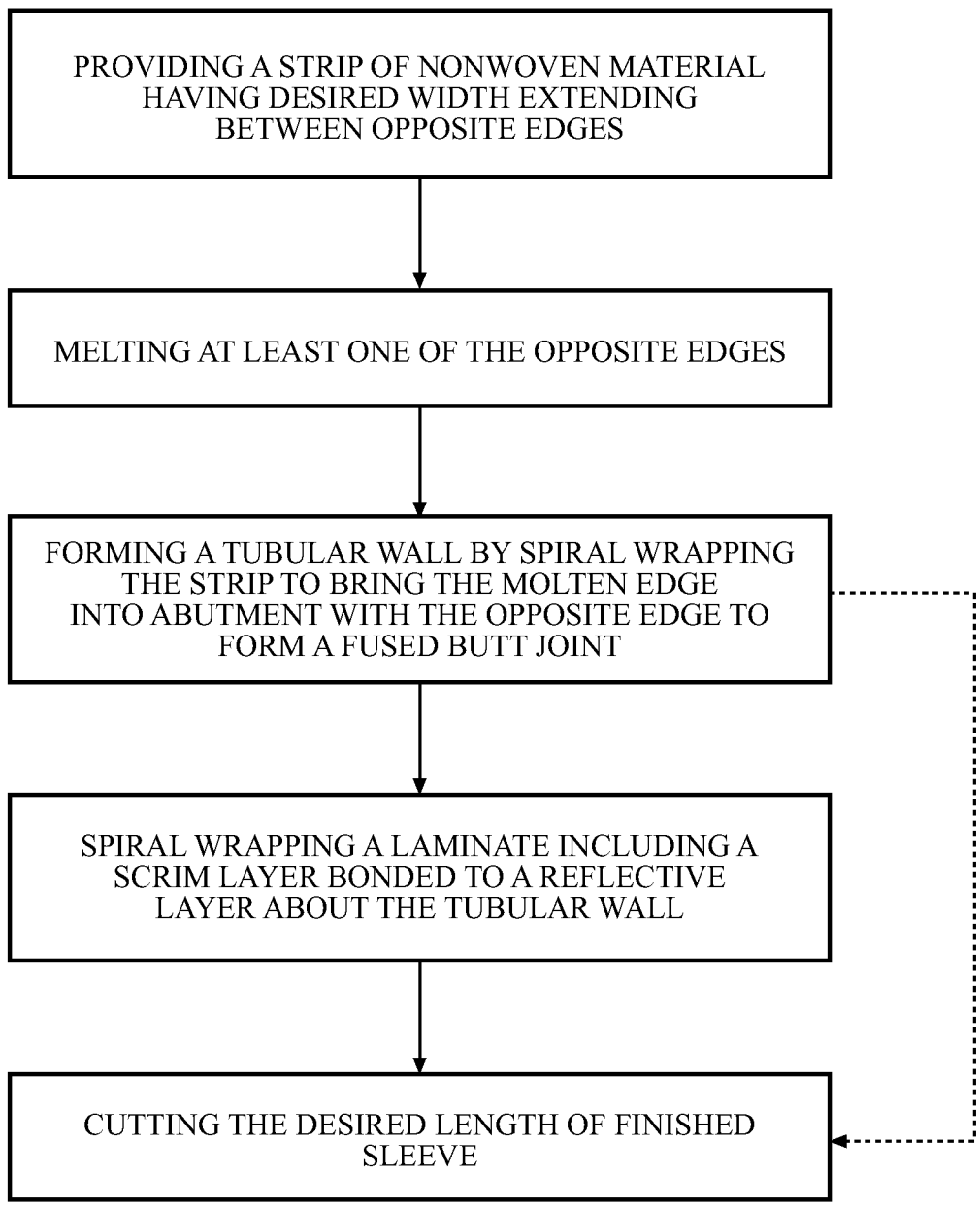
FIG. 4 is process flow chart illustrating a sequence of steps used to construct a sleeve in accordance with the invention.

Referring in more detail to the drawings, FIG. 1 illustrates a protective, spiral wrapped, tubular nonwoven sleeve, referred to hereafter as sleeve 10, constructed in accordance with one aspect of the invention. The sleeve 10 has a tubular spiral wrapped nonwoven wall 12 that extends along a central longitudinal axis 14 of the sleeve 10 between opposite ends 16, 18. The wall 12 is formed from a strip 20 of nonwoven material, wherein the strip 20 is spiral wrapped about the central longitudinal axis 14 over a plurality of circumferentially extending helical turns with opposite edges 22, 24 of the strip 20 being brought into flush abutment with one another to form a spirally extending smooth butt joint 26. The opposite edges 22, 24 are bonded together along and across the spiral butt joint 26 by melted, also referred to as fused, material of the nonwoven strip 20, and as such, the spirally wrapped wall 12 is prevented from unraveling along the butt joint 26 or otherwise having loose, unbonded ends of the strip 20 adjacent the ends 16, 18 of the sleeve.

The nonwoven strip 20 is formed of any suitable thermal insulating nonwoven material containing, at least in part, a heat-meltable or fusible material, such as containing, at least in part, fibrous or powdered polyethylene terephthalate (PET) or fibrous or powdered polypropylene (PP), by way of example and without limitation. The strip 20 can be provided having any width that is suitable to be spiral wrapped to form the diameter of sleeve desired, such as between about ½-3 inches, for example, wherein the width is defined by the distance extending across the opposite edges 22, 24. As the strip 20 is being spiral wrapped, such as on or about a forming mandrel 28 having an outer diameter corresponding with the finished sleeve inner cavity 31 diameter desired to receive an elongate member 29 to be protected therein, such as a wire harness or fluid conveying pipe, by way of example and without limitation, at least one of the strip edges 22, 24 is heated via a heated member 30, and for manufacturing ease and economic reasons only a single edge 24 need be heated. The heated member 30 can include, by way of example and without limitation, a hot wire, typically in the form of a heated flat metal ribbon. It should be recognized that the heated member 30 applies a suitable degree of heat to the associated strip edge 22, 24 to cause the strip edge 22, 24 to become at least partially molten. As such, the nonwoven material forming the edge 24 of the strip 20, upon being heated, is caused to at least partially melt and remain at least partially molten until having been completely wrapped into its spiral configuration, and thus, upon being wrapped, the molten edge 24 acts as an adhesive upon being brought into abutment with the opposite non-heated, unmelted edge 22. As such, when the strip 20 is wrapped over the mandrel 28 and about the axis 14, the melted edge 24 is brought into flush abutment with the adjacent edge 22, wherein the at least partially melted, molten material of the edge 24 is fused and solidified in bonded relation to the adjacent edge 22. Accordingly, the bonded spiral butt joint 26 is formed as a fused joint, upon cooling, via melted and subsequently cooled material of the nonwoven strip 20, without need for a secondary adhesive material, to firmly and reliably bond the edges 22, 24 to one another along the entirety length of the spiral wrapped wall 12. As such, the edges 22, 24 are prevented from becoming inadvertently detached from one another at any point along the joint 26, even when the resulting tubular wall 12 is cut to length, such as in a subsequent sizing operation. Further, with the joint 26 being formed as a butt joint, it should be recognized that an outer surface 32 of the wall 12 is formed as being cylindrically smooth, thereby being free of any raised edges, such as raised edges that are typically formed in constructions having overlapping edges. Thus, being free of raised edges, the wall 12 does not tend to get caught on neighboring objects, such as during installation or while in use, and thus, the edges 22, 24 are less prone to becoming separated or torn, and further, with their being no raised edges, the optional application of additional layers on the outer surface 32 of the wall 12 is simplified, with the bonding of any such layers to the outer surface 32 made more secure and reliable.

It should be recognized that while heating the edge 22, 24 to be bonded, whether one or both of the edges 22, 24, the material within an intermediate region 34 of the nonwoven strip 20 extending between the edges 22, 24 and between adjacent turns of the helically extending, fused butt joint 26 remains unheated, and thus, unmelted, as it is not exposed to the heat from the heated member 30 that causes the heated edge 24 to melt. As such, upon being wrapped, the intermediate region 34 retains its "as produced" flexible nonwoven physical properties, as it is not caused to become solidified or otherwise hardened. Accordingly, the flexibility of the sleeve 10 is enhanced by the spirally extending, non-melted, intermediate region 34, thereby allowing the sleeve 10 to be readily routed over meandering paths. Further yet, with the intermediate region 34 remaining flexible, undo stress on the bonded butt joint 26 is avoided while bending the sleeve 10, as the flexing can take place entirely or substantially within the enhanced flex intermediate regions 34 and not within the bonded, and slightly hardened butt joint 26.

Upon forming the spiral wrapped wall 12, a reflective outer layer 36 can be wrapped about the wall 12. The reflective outer layer 36 is preferably provided as a foil layer, such as aluminum, which in turn, is preferably bonded to an inner, intermediate layer 38. The intermediate layer 38 can be provided as any suitable heat resistant scrim material, such as a spun bonded layer of fiberglass, by way of example, or as an impervious sheet or puncture resistant film layer, by way of example. The reflective outer layer 36 and the intermediate layer 38 are preferably bonded to one another via any suitable heat resistant adhesive layer to form a laminate 40 prior to wrapping the laminate 32 about the nonwoven wall 12. The laminate 40, provided as a strip, can then be spiral wrapped, similarly as the nonwoven strip 20, about the wall 12 immediate following the formation of the wall 12 in a single, in-line process. The laminate 32 can be bonded to the outer surface 32 of the wall 12 via any suitable heat resistant adhesive layer.

Upon wrapping the wall 12 with the laminate 40, the desired length of the sleeve 10 is formed in a cutting operation. Upon cutting the desired length of sleeve 10, the ends 16, 18 are formed having a clean cut and the wall 12 is assured of remaining tubular and free from loose ends, such as could result if not for the bonded butt joint 26 formed between the mating, fused edges 22, 24.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A nonwoven sleeve for providing protection to a member therein, comprising:

a cylindrically smooth tubular nonwoven wall extending along a central longitudinal axis between opposite ends, said tubular nonwoven wall being formed from a strip of nonwoven material, said strip of nonwoven material being spiral wrapped about said central longitudinal axis over a plurality of circumferentially extending turns with opposite edges of said strip being brought into abutment with one another to form a spiral butt joint, said opposite edges being bonded together across said butt joint solely by melted material of said strip of nonwoven material.

2. The nonwoven sleeve of claim 1 wherein said strip of nonwoven material has an intermediate region extending between said opposite edges, said intermediate region being unmelted.

3. The nonwoven sleeve of claim 1 further including a reflective outer layer.

4. The nonwoven sleeve of claim 3 wherein said reflective outer layer is foil.

5. The nonwoven sleeve of claim 3 further including an intermediate layer between said tubular nonwoven wall and said reflective outer layer.

6. The nonwoven sleeve of claim 5 wherein said intermediate layer is fiberglass.

7. The nonwoven sleeve of claim 5 wherein said reflective outer layer and said intermediate layer are spiral wrapped about said tubular nonwoven wall.

8. The nonwoven sleeve of claim 7 wherein said intermediate layer is bonded to said reflective outer layer and to said tubular nonwoven wall by an adhesive layer.

9. The nonwoven sleeve of claim 2 wherein said intermediate region extends spirally from one of said opposite ends to the other of said opposite ends.

\* \* \* \* \*